(12) United States Patent
Menzel et al.

(10) Patent No.: US 6,637,092 B1
(45) Date of Patent: Oct. 28, 2003

(54) METHOD AND APPARATUS FOR WINDING A HELICAL PIPE FROM ITS INSIDE

(75) Inventors: Stanley William Otto Menzel, Burnside (AU); by Peter Oswald Buttery, executor, Woodforde (AU)

(73) Assignee: Rib Loc Australia Pty Ltd., So. Australia (AU)

( * ) Notice: Subject to any disclaimer, the term of this patent is extended or adjusted under 35 U.S.C. 154(b) by 0 days.

(21) Appl. No.: 09/787,662

(22) PCT Filed: Sep. 22, 1999

(86) PCT No.: PCT/AU99/00808
§ 371 (c)(1),
(2), (4) Date: Mar. 21, 2001

(87) PCT Pub. No.: WO00/17564
PCT Pub. Date: Mar. 30, 2000

(30) Foreign Application Priority Data

Sep. 22, 1998 (AU) .............................................. PP 6106

(51) Int. Cl.[7] .................................................. B23P 11/02
(52) U.S. Cl. ...................... 29/451; 29/453; 29/402.09; 264/36.16
(58) Field of Search .......................... 29/431, 451, 453, 29/402.09, 429; 138/97, 154; 264/36.16

(56) References Cited

U.S. PATENT DOCUMENTS

| 4,209,043 A | * | 6/1980 | Menzel | ...................... | 138/154 |
|---|---|---|---|---|---|
| 4,566,496 A | * | 1/1986 | Menzel et al. | .............. | 138/154 |
| 4,630,650 A | * | 12/1986 | Davis | .......................... | 138/154 |
| 4,687,690 A | * | 8/1987 | Menzel | ...................... | 138/154 |
| 5,660,912 A | * | 8/1997 | Menzel | ...................... | 138/154 |
| 5,799,701 A | | 9/1998 | Kitahashi et al. | | |

FOREIGN PATENT DOCUMENTS

| FR | 2686678 | 7/1993 |
|---|---|---|
| WO | 9005873 | 5/1990 |

OTHER PUBLICATIONS

Derwent Abstract Accession No. 99–075355, Abstract and Figures.

* cited by examiner

Primary Examiner—David P. Bryant
(74) Attorney, Agent, or Firm—Stout, Uxa, Buyan & Mullins, LLP; Frank J. Uxa

(57) ABSTRACT

A machine (200) for winding a strip of material (212) into a helical pipe wherein adjacent convolutions of the strip (212) are interlocked. The machine comprises: a frame (220) having circumferentially spaced supports in the form of rollers (266, 276, 278, 286, 288, 296 and 298) adapted to bear against the inner periphery of the pipe being wound, the outer peripheral surfaces of the rollers forming a helical path for the strip (212) and along which the strip (212) is directed when the machine (200) is in use; driving rollers (224) mounted to the frame (220) for driving the strip (212) around the outside of the rollers so as to follow the helical path and cause the adjacent edges the strip (212) to interlock; and drive means (226) mounted to the frame for driving the driving rollers (224). The driving rollers (224) and the drive means are located wholly inside of the path formed by the rollers and no part of the machine (200) engages the outer periphery of the pipe being wound.

20 Claims, 19 Drawing Sheets

METHOD AND APPARATUS FOR WINDING A HELICAL PIPE FROM ITS INSIDE

This invention relates to an improved method of and an apparatus for winding pipes from an elongate strip.

It is now well known to repair conduits by the insertion of a helically wound tube of smaller diameter than the corroded or damaged part. The annular space between the new pipe and the old conduit is filled with grout, usually of a cementitious nature. One of the problems of such a practice is that the finished relined pipe is of smaller diameter than the original conduit. Furthermore, a conduit to be relined is usually out of alignment and has undulations and curves, which means that the relining pipe which is formed must be even smaller in diameter to negotiate such undulations and misalignments.

Also when a hole is formed directly into the soil, the lining of such holes requires a lining pipe of a diameter considerably smaller than the diameter of the hole because of the friction which is generated between the earth and the liner pipe being inserted.

It is already well known to form pipes by winding a ribbed strip of plastics material and joining the edges of convolutions of the strip to progressively form a helically wound tube of the required length. Earlier patents by the same inventor relate to the shape of the strip, the actual form of the strip, the particular jointing means for contiguous edges, the strengthening of the strip by co-wound strengthening members or the like, and to the design of a machine for winding such a strip into a tubular structure.

A tube of this type has to be wound into position in a conduit. One of the special uses and advantages of such a tube is that it can be wound into a conduit by placing the machine into a position at the end of the conduit, which may be below ground, and continuously form the tube and advance it into the conduit for the required distance. Such a system has been used for the relining of sewer pipes and other conduits and in general the tube was grouted into position because it was not possible to wind the tube of a diameter to neatly fit the inner wall of the conduit.

A system was devised by the same inventor known as the "expanda pipe" system in which, after forming the tube by winding in the normal manner, and advancing it into the conduit, the tube was expanded to a larger diameter to engage the wall of the conduit. Such a system formed the subject matter of International Patent Application No. PCT/AU87/00069.

While the "expanda pipe" system is extremely useful in many applications, it does have some limitations. One limitation is the limit as to the length of pipe that can be produced between joins. This limit arises due to the friction working against rotation of the pipe which, after winding a certain pipe length, becomes too high. The limitations of "expanda pipe" become more problematic as the tube diameter increases and cannot be practically accommodated above diameters of about 1 meter. A further limitation of the "expanda pipe" system is that a specific type of interlocking rib profile is required that adds to the cost of manufacture.

Conventional conduit relining methods, including the "expanda pipe" system, require the conduit to be relined to be out of use, by-passed or "over pumped". The conduit must be drained of liquids while the relining process is in progress. In many applications this interruption can produce difficulties for sewerage or stormwater system operators.

It is an object of the present invention to provide a method and apparatus that overcomes at least some of the problems of the prior art.

According to a first aspect of the invention there is provided a method of winding a helically wound pipe from a strip having connecting formations spaced apart transversely on the strip and adapted to interlock when the strip is wound in a helical path and adjacent edge portions of the strip overlap one another, said method comprising the steps of:
  feeding the strip in a substantially axial direction with respect to the axis of the pipe being wound;
  passing the strip between at least one pair of drive rollers located inside of said helical path;
  driving the strip around the outside of a plurality of circumferentially spaced guide rollers arranged to form a guide to enable the strip to follow the helical path; and
  effecting the interlocking of the adjacent edge portions of the strip relying solely on forces acting on the driven strip and the reactive force provided by tension in adjacent convolution(s) of the strip.

Preferably the radial positions of the guide rollers are adjusted during winding of the strip to thereby vary the circumferential length of the helical pipe being wound.

Preferably the radial positions of the guide rollers are adjusted in unison.

In a further aspect of the invention, there is provided a machine for winding a helically wound pipe from a strip having complementary connecting formations extending along opposite edge portions thereof and which are adapted to interlock when the strip is helically wound comprising:
  a frame having at least three circumferentially spaced guide rollers adapted to bear against the inner periphery of the pipe being wound, the rollers forming a guide to a enable the strip to follow a helical path along which the strip is directed when the machine is in use;
  strip drive roller means mounted to the frame for driving the strip around the outside of the rollers so as to follow the helical path and cause the adjacent edge portions of adjacent convolutions of the strip to interlock; and
  drive means mounted to the frame for driving the strip drive roller means,
  characterised in that the strip drive roller means is located wholly inside the helical path and that there is no support means arranged to bear against the outer periphery of the pipe being wound to cause the interlock.

Preferably adjustment means are provided for adjusting the radial positions of the guide rollers.

Preferably further adjustment means are provided for adjusting the angles of the axes of the guide rollers relative to the longitudinal axis of the machine.

The pipe winding machine can either be fixed, with the helical pipe produced exiting from the machine in a continuous process, or can be rotatably movable against the newly formed fixed helical pipe so that it advances axially as the pipe is wound.

Specific embodiments of the invention will now be described in some further detail with reference to and as illustrated in the accompanying figures. These embodiments are illustrative, and are not meant to be restrictive of the scope of the invention.

Figure 1:
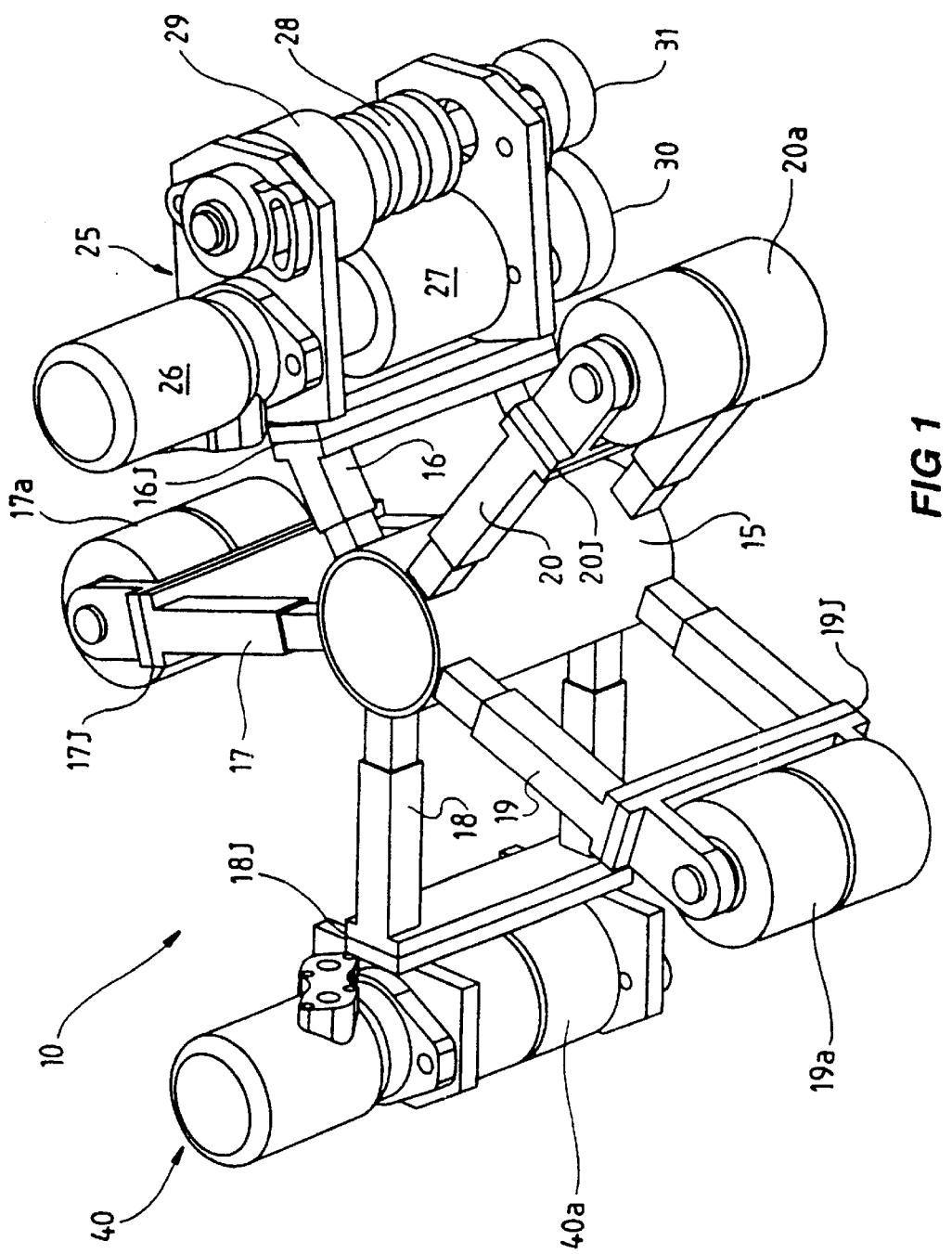
FIG. 1 shows a first embodiment of a pipe winding machine according to the invention, in perspective view.
Figure 2:
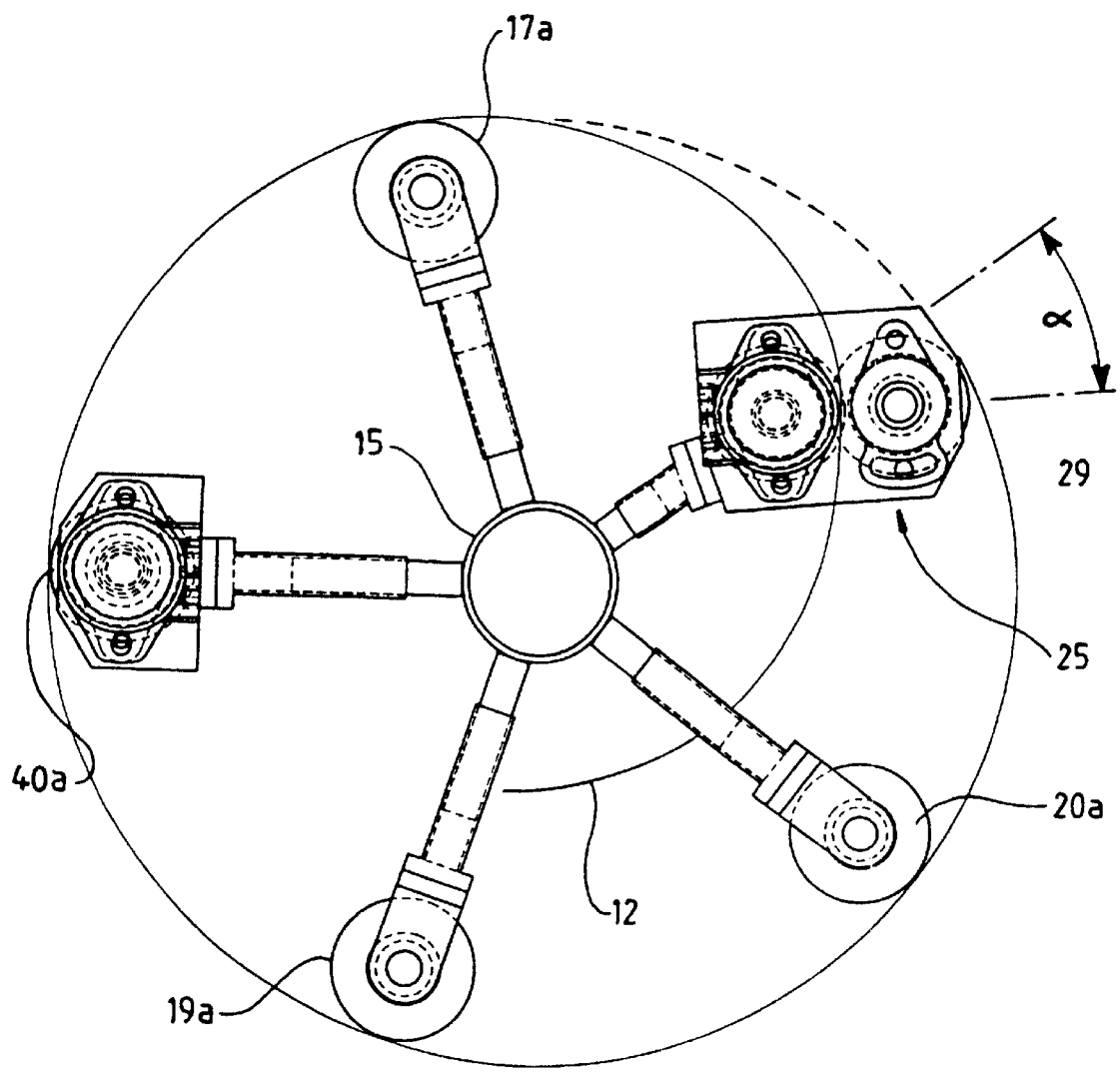
FIG. 2 shows the pipe winding machine of FIG. 1 in front view.

A pipe winding machine 10 according to the first embodiment is shown in FIG. 1. The pipe winding machine 10, shown in FIGS. 1 and 2 is able to create helical pipe by driving a pre-coiled strip of ribbed plastics material along a helical path and interlocking adjacent edge portions of adjacent convolutions of the strip 12, without the need for an externally located joining roller or support surface—as is most clearly shown in FIG. 2.

In use, this apparatus can operate in a number of ways. The pipe winding machine 10 can either be fixed, with the helical pipe produced exiting from the machine in a continuous process, or can be rotatably movable against the newly formed fixed helical pipe and advances axially as the pipe is wound. The following description of the machine and how it works is based on the latter (a movable machine) operating within a conduit (for instance, a degraded sewer conduit).

The pipe winding machine 10 is located within a conduit to be lined and performs the function of taking a long length of strip and forceably laying it onto the inner wall of the conduit to form a helical tube or pipe, thereby lining the conduit. This operation is illustrated in cut-away view in FIG. 3.

Figure 3:
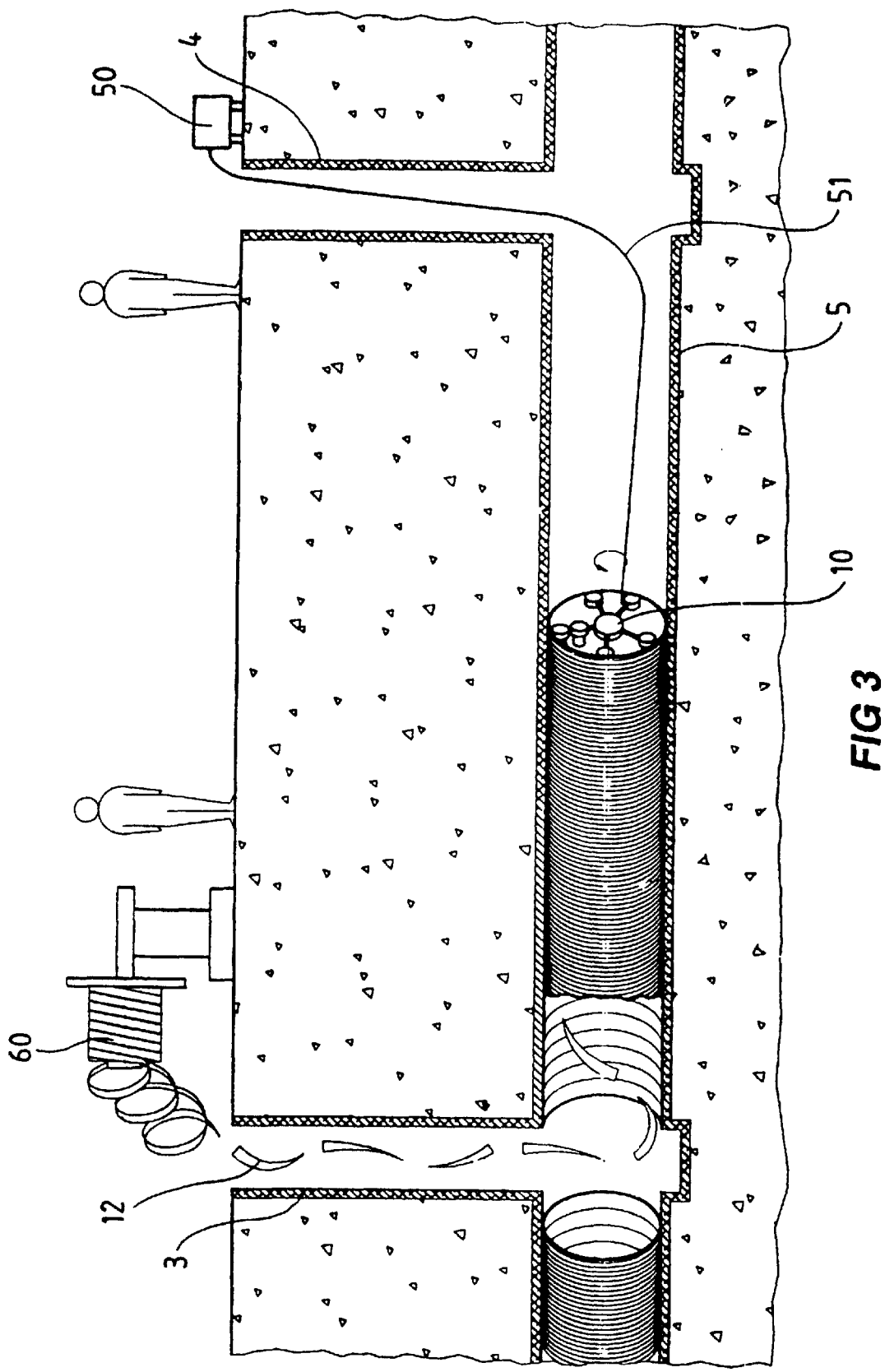
FIG. 3 is a schematic cut-away view of an underground conduit with the pipe winding machine of FIG. 1 in operation lining the conduit.

FIG. 3 shows a below ground conduit 5 accessible through access holes 3 and 4. Pipe winding machine 10 is shown in use within conduit 5. Strip 12 is fed from an above ground strip dispenser 60 down through access hole 3 to the winding machine 10. Powered by hydraulic power source 50 via hydraulic fluid hose 51, drive units within pipe winding machine 10 provide the motive power to continuously wind strip 12 directly onto the inner wall of conduit 5 to create a helical tube 6. In this process it is the pipe winding machine 10 that rotates about the longitudinal axis of the conduit 5 and the helical tube 6 does not rotate relative to the conduit 5. Electric drive units may be used in lieu of hydraulic drive units.

The pipe winding machine 10 of FIGS. 1 and 2 has a frame with five circumferentially spaced supports in the form of guide rollers 17a, 40a, 19a, 20a and 29. The outer surfaces of these five rollers provide a helical path for the strip 12. A pair of pinch rollers 27 and 28 are mounted on radial arm 16. A primary hydraulic motor 26 drives a shaft to which are keyed pinch roller 27 and drive gear 30. Drive gear 30 drives driven gear 31 which is mounted on a shaft which drives pinch roller 28. On the same shaft is idler roller 29 which, in use, bears against the inner wall of the conduit. Primary drive unit 25 is angled back (at an angle a as shown in FIG. 2) from radial arm 16. This causes the strip 12 which is forced out between pinch roller 27 and 28, to engage the previous winding of strip 12 and the inner wall of conduit 5 at a steeper angle than it otherwise would and assists in compressing the strip against the inner wall of conduit 5. This effect can be seen in FIG. 2.

A second drive unit 40 is mounted on radial arm 18. This secondary drive unit 40 is optional. It is useful in applications where high forces are required to line a conduit. The position of secondary drive unit 40 can be varied. For instance, it can be located at the ends of radial arms 17,19 or 20 as shown in FIG. 1, rather than at the end of radial arm 18.

Radial arms 16, 17, 18, 19 and 20 are slidably mounted on hub 15. They are biased radially outwards by springs or hydraulic actuators (not shown). The sliding joints enable the support rollers 19a, 40a, 17a, 20a and 29 to move radially inwards or outwards. This enables the pipe winding machine 10 to traverse portions of conduits which have indentations. It also allows a single lining machine 10 to be used in conduits of differing diameters.

Flanged points 16j, 17j, 18j, 19j and 20j (shown in FIG. 1) allow the angle of the axes of rollers 29, 17a, 40a, 19a and 20a respectively to be varied with respect to the axis about which the lining machine 10 orbits. The adjustability provided by these flanged joints allow the axes of the rollers to be set to correspond to the helix angle of the helical liner tube being produced. In other words, this allows the axis of each roller to be set to be orthogonal to the edges of the strip on which, or adjacent to which, it rolls. The effect of this is that the machine 10 will helically progress along the conduit being lined as the rollers orbit about the longitudinal axis of the conduit. Where a strip with an integral jointing means is used, small deviations of the lining machine 10 from the correct helix angle matching that of the newly lined helical tube are corrected by forces generated as the strip is forcibly laid onto the inner wall of the conduit 5.

In a variant of this embodiment of the invention, the support rollers 19a, 40a, 17a, 20a and 29 are supported on trailing arms which trail behind radial arms (which could be of similar construction to radial arms 16, 17, 18, 19 and 20).

Figure 4:
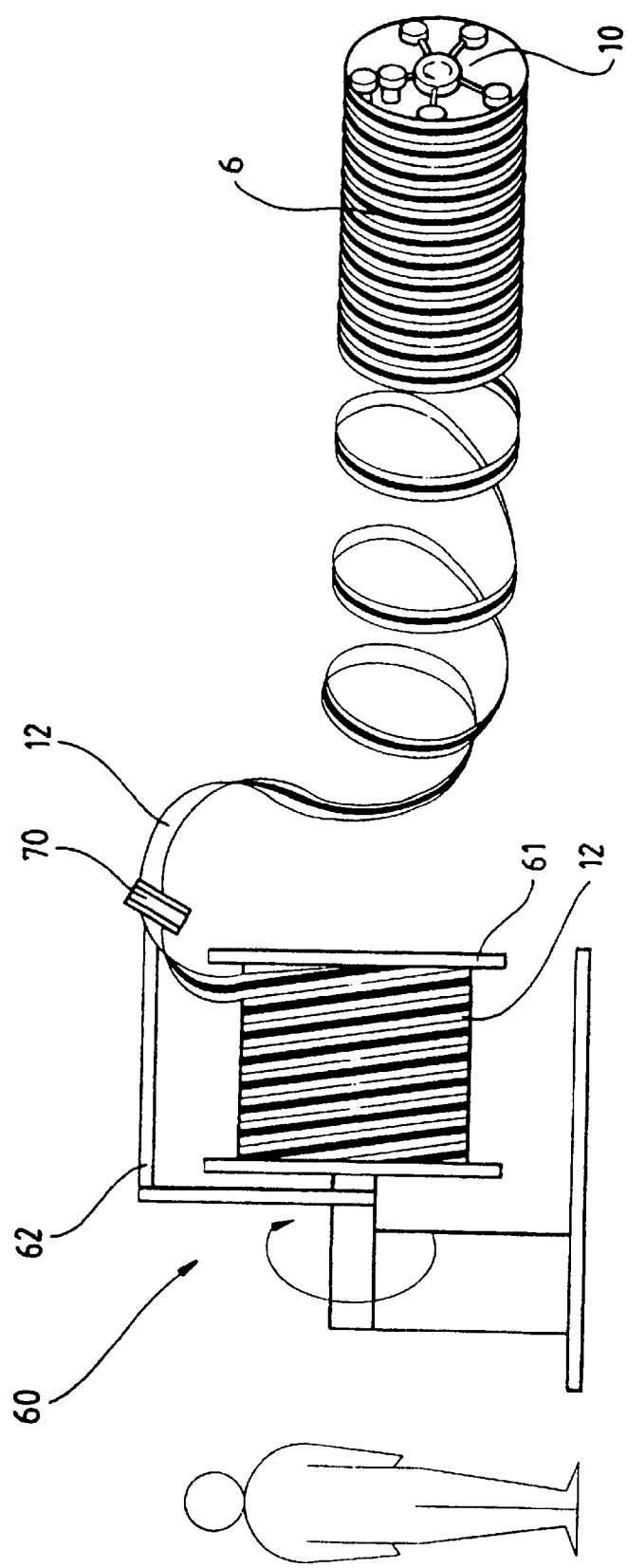
FIG. 4 is a schematic view showing the dispensing of strip from a reel, through pre-bending rollers, to the pipe winding machine of the invention.
Figure 5:
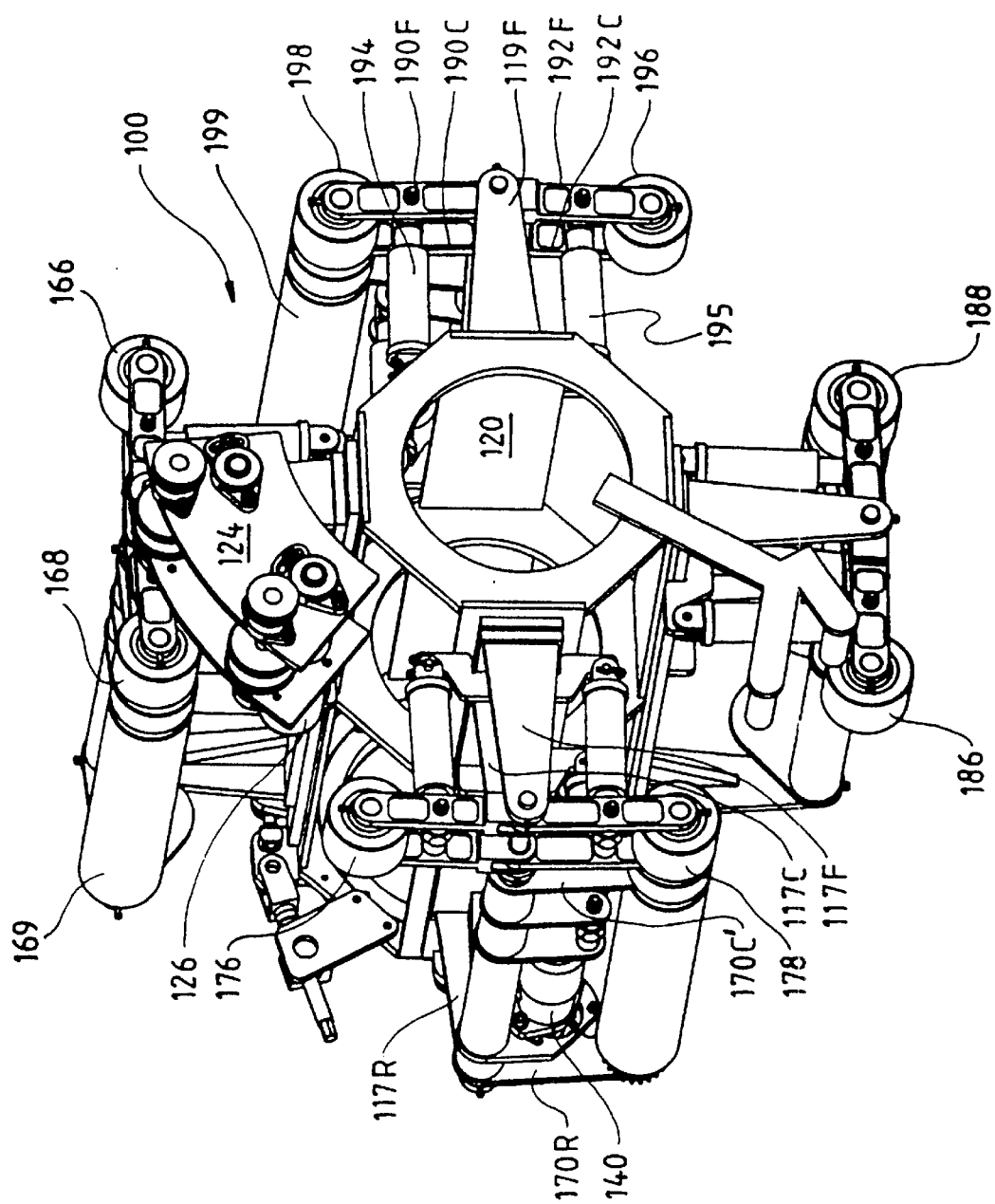
FIG. 5 shows a second embodiment of a pipe winding machine according to the invention in perspective view (from the front)

In use, an elongate strip 12 is fed from a dispenser 60, through pre-bending rollers 70, down an access hole 3 to a pipe winding machine 10 as shown in FIGS. 3 and 5. The pipe winding machine 10 is supplied with hydraulic fluid from a surface mounted hydraulic supply pump 50 via an hydraulic hose 51. The elongate strip 12 feeds into the pinch rollers 27 and 28 of the machine 10 as shown in FIG. 4. The two pinch rollers drive the strip towards the inner wall of the conduit 5 in a direction slightly offset from orthogonal to the longitudinal axis of the conduit, so that the strip engages the edge of the previous winding of strip 12 and is forcibly and helically laid against the inner wall to form a tube which is substantially contiguous with the inner wall of conduit 5. During this process, the two pinch rollers 27 and 28 are themselves orbiting about the longitudinal axis of the conduit 5 so that the distance between the pinch point and the strip contact point 14 on the inner wall of the conduit remains substantially constant as the tube is continuously wound (refer FIG. 2).

In order to commence winding the pipe, the strip 12 must be manually fed into the bite of pinch rollers 27 and 28 and the first convolution of the strip must be guided to the outside of rollers 17a, 40a, 19a, 20a and 29 as shown in FIG. 2. Once the incoming strip 12 has interlocked with its adjacent convolution as shown in FIG. 2, the machine 10 can operate automatically and continuously.

A secondary drive unit 40 (driven by hydraulic motor 41) mounted on radial arm 18 provides additional drive reducing the work required of primary drive 26. The drive provided by primary drive unit 26 is higher than that provided by secondary drive unit 40 to produce a compression of the strip 12 between its pinch point between rollers 27 and 28 and between its compression against the inner wall of conduit 5 by roller 40a. This compression of the strip 12 assists in causing the walls of the finished helical tube 6 to be contiguous or nearly contiguous with the inner wall of the conduit 5. This compression effect can be varied both by varying the relative forces produced by the primary and secondary drive units and by varying the angle at which the drive unit 25 is mounted. Different pipe sizes and different strip profiles will require different degrees of strip compression.

The strip dispenser 60 with integral pre-bending rollers 70, as shown in FIG. 5, performs two important functions. Firstly it unwinds the strip 12 in such a way that the helical coils fed into the conduit 5 are optimally shaped to be received by machine 10 in a continuous process. Secondly, it ensures that the strip is pre-bent so that the drive units 25 and 40 are not overloaded. This is particularly important in applications where a strip of high rigidity is required.

In operation, both the reel 61 and the arm 62 rotate in order to feed strip 12 to the machine 10. The relative rotational speed of reel 61 and arm 62 is varied to achieve the optimum discharge of helical strip to lining machine 10.

The pipe winding machine 10 and method of lining a conduit offers many advantages over existing pipe lining machines and processes. The pipe winding machine 10, shown in FIGS. 1 and 2, can continuously line conduits over very long lengths without the need to stop and create tube joins. The machine is also able to continue through partially collapsed or damaged areas of conduit. This is possible because the support rollers 40a, 19a, 20a, 29 and 17a are all mounted on radial arms which are able to radially retract. Where there are large holes within a conduit to be relined, it will not generally be necessary to insert a band over the hole to enable the machine to continue as the machine is able to wind a free-standing liner.

The pipe winding machine 10 may have hydraulic actuators fitted to radial arms 16, 17, 18, 19 and 20 which are able to controllably apply pressure to specific areas of the inner wall of the conduit being lined. The effect of this is that partially collapsed conduits can be expanded out by this machine. The machine is then able to line the conduit in its expanded form with strip 12 to form an inner tube of a larger diameter than would otherwise have been possible. Because this is a single stage operation, the expanded conduit is immediately supported from collapse by the newly wound helical tube. The same hydraulic actuators together with hydraulic motors 26 and 41 can also be controlled so as to prevent the helical pipe 6 growing in diameter as it passes holes within the conduit being relined.

The above described machines and method may be used with a wide variety of different strip profiles. Where a separate joining strip is used to interlock the adjacent edges of the strip, the lining machine 10 abuts the contiguous edges for subsequent joining by the joining strip. Advantageously a strip with a large interlocking section may be used. The force generated by the pinch rollers 27 and 28 working against the secondary drive unit 40 can be sufficient to cause locking of such a strip at its edges as soon as the strip contacts the inner wall of the conduit. In cases where this force is insufficient, roller 17a performs the locking function.

In applications where a heavy duty helical tube 6 is required, for instance for lining large diameter conduits or for conduits requiring strengthening, plastic steel reinforced strip may be used. Such a strip will generally need to initially wound down to a diameter slightly less than the diameter of the desired helical tube 6 diameter. Strip dispenser 60 (as shown in FIG. 5) performs this function before the strip is fed down into conduit 5. The conduit lining machine 10 then winds up the diameter as it forces the strip against the inner wall of the conduit 5 as described previously.

Various hydraulic fluids may be used, including water. If water is used, a total loss system can be employed where the spent hydraulic fluid (water) can be used for continuous cleaning purposes.

Figure 6:
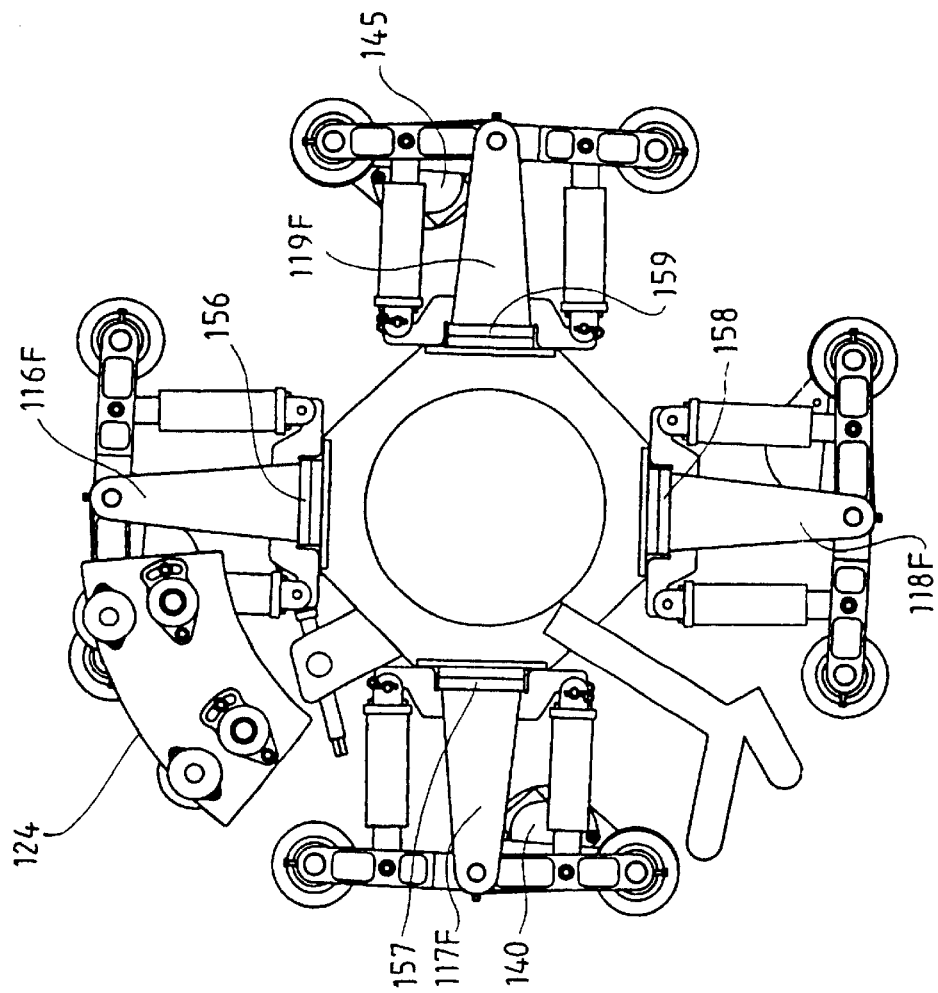
FIG. 6 is a front end view of the machine of FIG. 5.
Figure 7:
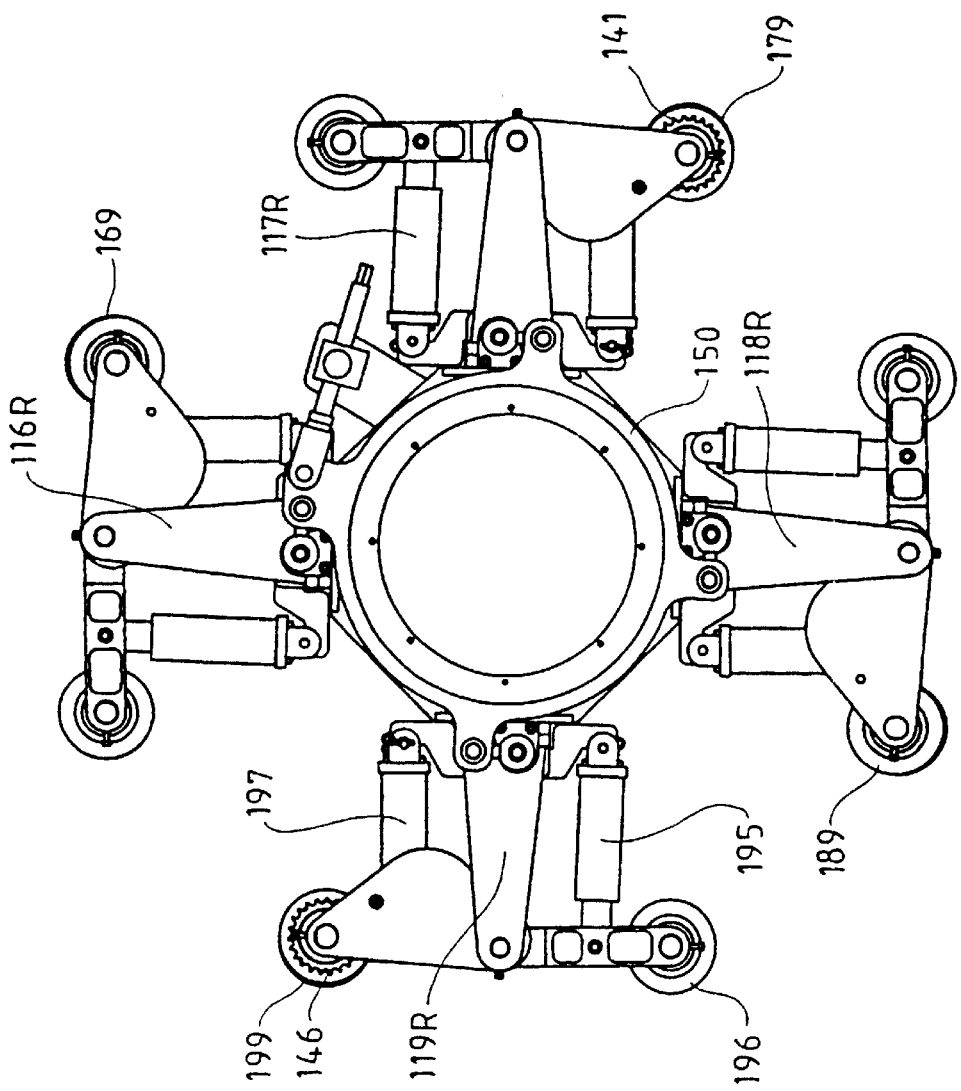
FIG. 7 is a rear end view of the machine of FIG. 5.

A second embodiment of the invention is shown in FIGS. 5 to 7.

The pipe winding machine 100, shown in FIG. 5, is able to create a helical pipe by driving a strip of material, from a position inward of the inner periphery of the pipe to be formed, to a position adjacent the previous winding of the strip. For clarity, the strip is not shown on FIGS. 5 to 7, however it follows a similar path to strip 12 and 212 shown in FIG. 2 of the first embodiment, and FIGS. 9, 11 and 12 of the second embodiment, respectively.

The pipe winding machine 100 can either be fixed, with the helical pipe produced exiting from the machine in a continuous process, or can be movable against the newly formed fixed helical pipe. The following description of the machine and how it works is based on the latter (a movable machine) operating within a conduit (for instance, a degraded sewer conduit).

Referring to FIG. 5, the pipe winding machine 100 has a frame 120 supporting eight circumferentially spaced guide rollers 166, 168, 176,178, 186, 188, 196 and 198. The outer surfaces of these eight rollers provide a helical path for the strip. A front end view of machine 100, presented in FIG. 6, shows the spatial positioning of these rollers. Two pairs of driving rollers are mounted within a pinch box 124 which is mounted inward of the circumference of the helical pipe being formed. Pinch box 124 is mounted to frame 120 and has two pairs of counter rotating rollers driven by hydraulic motor 126 which drive strip to a position adjacent the previous winding of the strip against a reactive force provided by the tension in the adjacent convolution or the adjacent convolutions of the strip causing the adjacent edges of the strip to interlock. As this is a continuous process, it causes the strip to be rolled into a continuous helical pipe around the winding machine 100.

Pinch box 124 is mounted to frame 120 in such a way as to allow adjustment of its angle with respect to frame 120.

In order to provide radial adjustment to rollers 166, 176, 178, 186, 188, 196 and 198 and therefore to allow machine 100 to operate for differing wound pipe diameters, interposed between frame 120 and the aforesaid rollers are pairs of radial arms 116F and 116C, 117F and 117C, 118F and 118C, and 119F and 119C (only arms 117F, 117C and 117R are identified in FIG. 5–FIGS. 6 and 7 show arms 116F and 116R, 117F and 117R, 118F and 118R and 119F and 119R). The arrangement of these arms relative to frame 120 is most clearly shown in FIG. 5. Frame 120 supports four sets of arms 116F, C and R, 117F, C and R, 118 F, C and R and 119F, C and R.

Referring to FIG. 5, connected to the distal ends of radial arms 119F and 119C are pivot arms 190F and 190C respectively. Distal ends of these pivot arms support roller 198. In a similar arrangement, connected to the distal ends of radial arms 119F and 119C are pivot arms 192F and 192C providing support for roller 196. The pivotal movement of arm pairs 190F and 190C and 192F and 192C are respectively controlled by actuators 194 and 195. These actuators enable the radial positions of rollers 196 and 198 to be controlled. A similar arrangement of pivot arms and actuators are connected to the distal ends of each of the other three radial arm pairs 116F and 116C, 117F and 117C and 118F and 118C as shown in FIG. 5.

By extending actuators 194 and 195 and the corresponding actuators connected to the aforementioned other pivot arms, the circumferential length of the helical pipe being wound can be varied. Each of these actuators are hydraulically actuated and are connected to the same hydraulic pressure source. Therefore they apply a constant force to their respective rollers. By increasing the hydraulic pressure while the pipe is being wound, the diameter of the pipe can be increased. Conversely, the diameter of the pipe can be reduced by reducing the hydraulic pressure.

In a variation of this embodiment, the pressure to each actuator is independently variable to allow control of the radial positions of each of the eight rollers 166, 168, 176, 178, 186, 188, 196 and 198.

Behind rollers 168, 178, 188 and 198 are machine support rollers 169, 179, 189 and 199 respectively. Each of these four rollers are mounted to frame 120 in a similar way to corresponding rollers 168, 178, 188 and 198. For instance, radial arms 117C (shown in FIG. 5) and 117R (shown in FIG. 7) support pivot arms 170C' and 170R (both shown in FIG. 5) which, in turn, support machine support roller 179.

Machine support rollers 179 and 199 are driven by auxiliary drive units 140 and 145 respectively (machine support rollers 169 and 189 are not driven). Drive is transmitted by sprocket and chains (sprockets 146 and 141 are shown in FIG. 7). These auxiliary drive units assist in rotating the machine around the inside of the helical pipe being formed and reduce the load on the pinch rollers within pinch box 124. These auxiliary drive units are optional as the machine will rotate and follow a helical path purely by the force generated by the pinch rollers in pinch box 124, provided an adequately sized hydraulic motor 126 is used.

The radial position of machine support rollers 169, 179, 189 and 199 can be varied by actuators (eg 197 shown in FIG. 7) to suit the diameter of the helical pipe being wound.

In addition to adjusting the radial positions of rollers 166, 168, 169, 176, 178, 179, 186, 188, 189, 196, 198 and 199 the angle of their axes with respect to the longitudinal axis of the machine 100 is also variable. These angles are adjustable in four groups:

166, 168, and 169
176, 178, and 179
186, 188 and 189
196, 198 and 199 by virtue of their respective mountings to plates: 156, 157, 158 and 159 as shown in FIG. 6. Each of these plates is pivoted at one end and connects at the other end to adjusting ring 150 as shown in FIG. 7. By rotation of shaft 149 adjusting ring 150 can be rotated. Through its connection to each of the four mounting plates 156, 157, 158 and 159, rotation of ring 150 causes simultaneous adjustment of all of the above four groups of rollers. In this way the machine 100 can be set up for the appropriate helix angle for the pipe being wound.

As stated above, the pipe winding machine 100 can also be used to create a free standing pipe above ground or in a trench. When used in this mode, the strip must include an interlocking section such as the one shown in FIG. 13. The interlocking profile of the previous helical winding provides a surface against which the strip can be pressed into by the pinch rollers against the reactive force provided by the tension in the adjacent convolutions of the strip.

Figure 12:
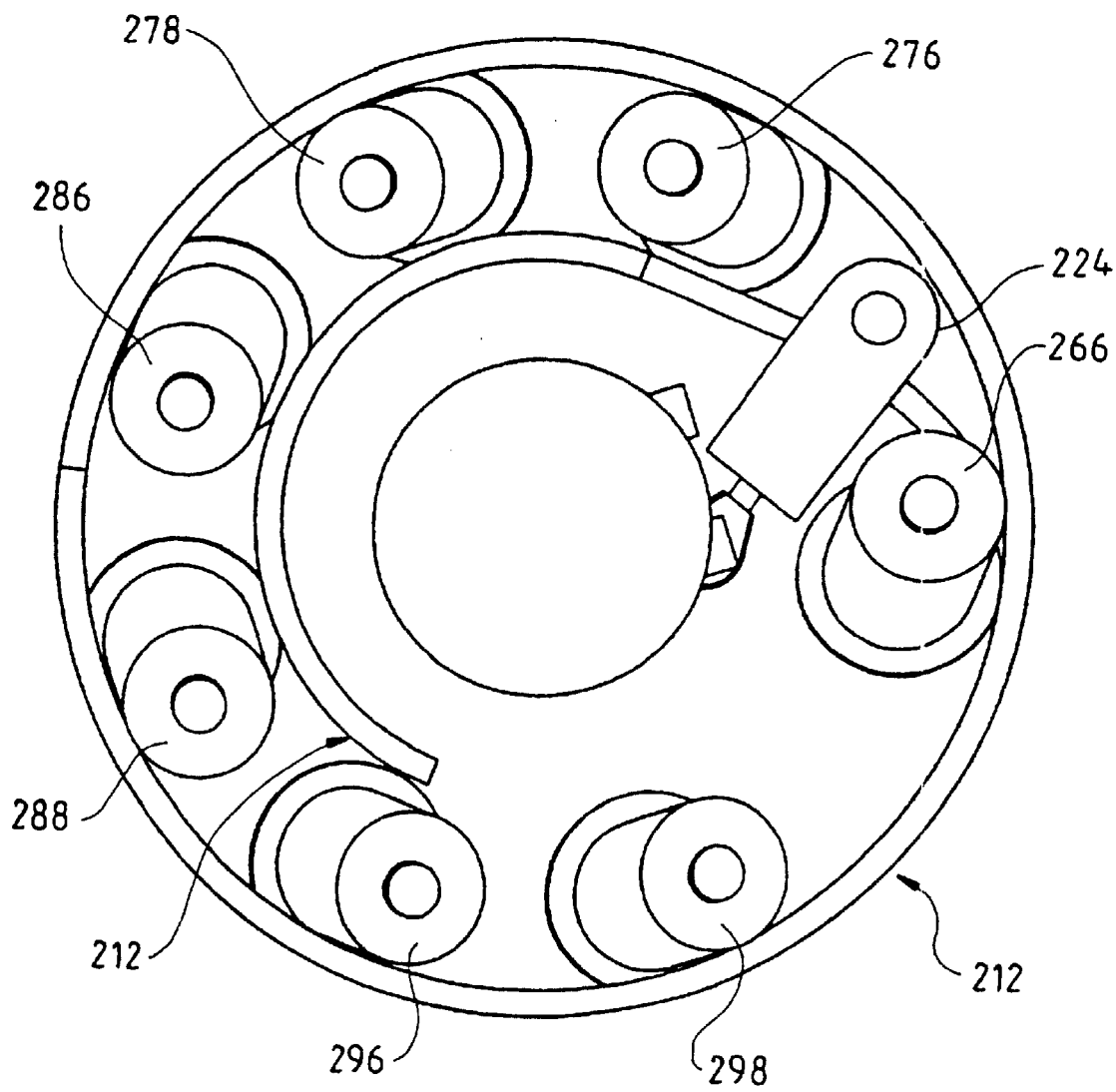
FIG. 12 shows a rear end view of the machine of FIG. 8.
Figure 13:
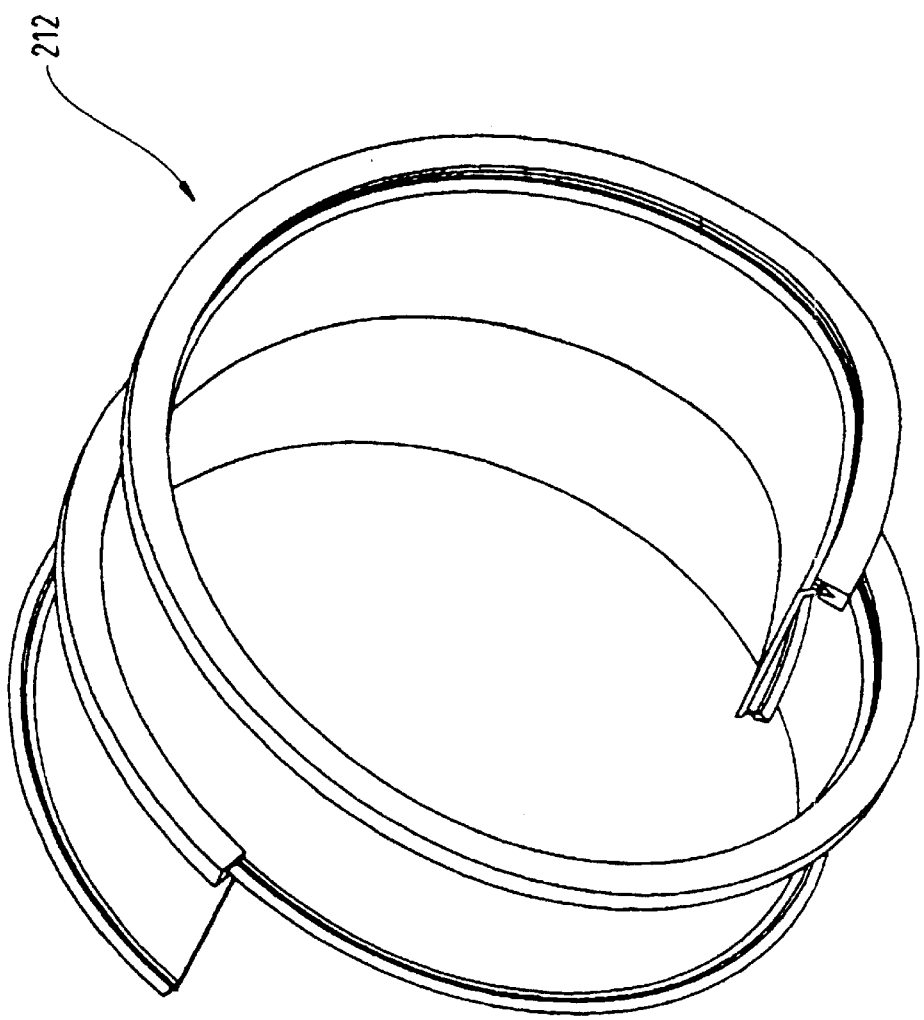
FIG. 13 shows a perspective view of partially wound strip having complementary rib and groove formations extending along its opposite edges.

A third embodiment of the invention is shown in FIGS. 8 to 12 and 14 to 21. FIG. 13 shows a strip profile 212 for use in this embodiment.

Figure 8:
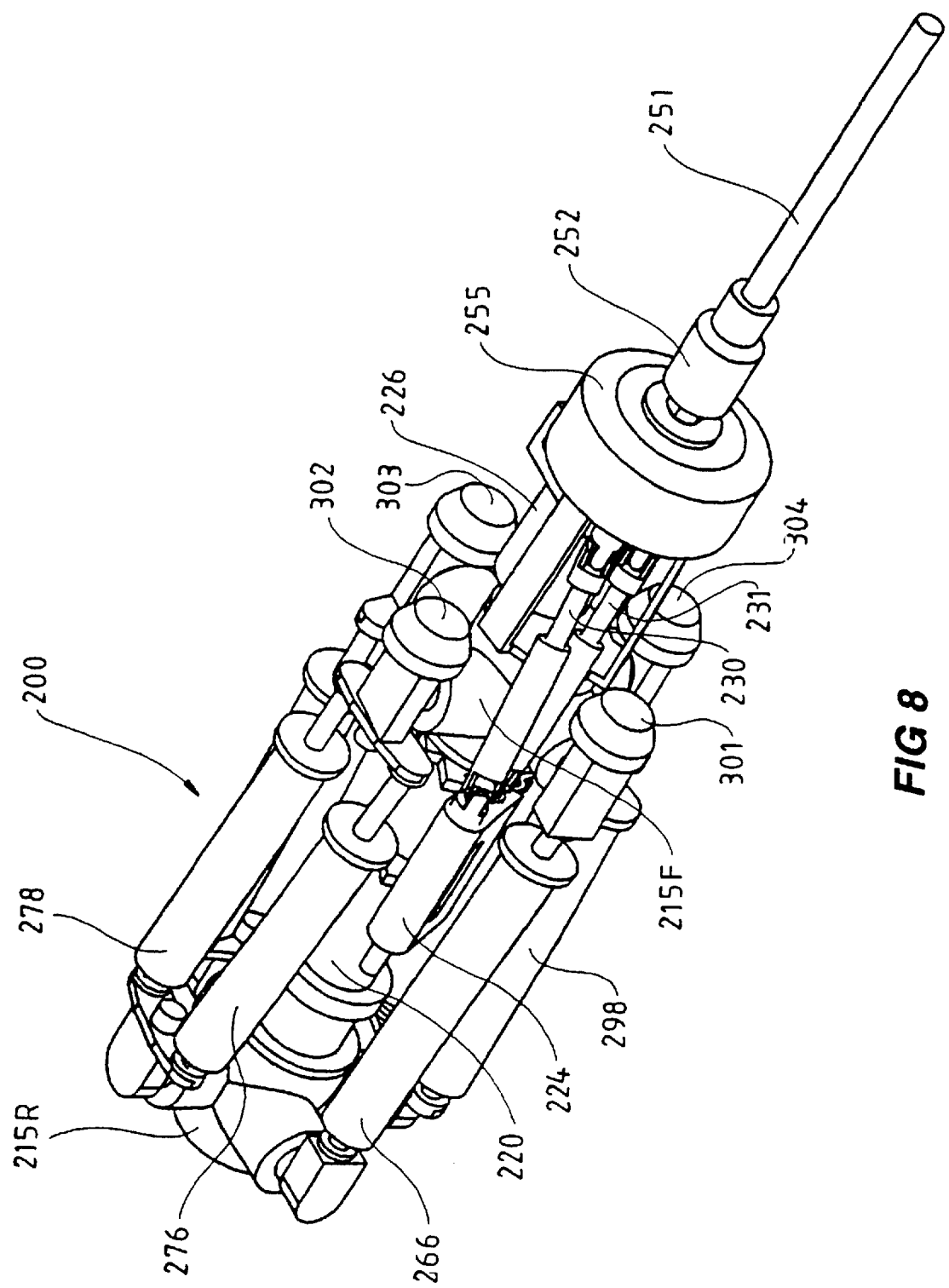
FIG. 8 shows a third embodiment of a pipe winding machine according to the invention in perspective view (from the front)
Figure 9:
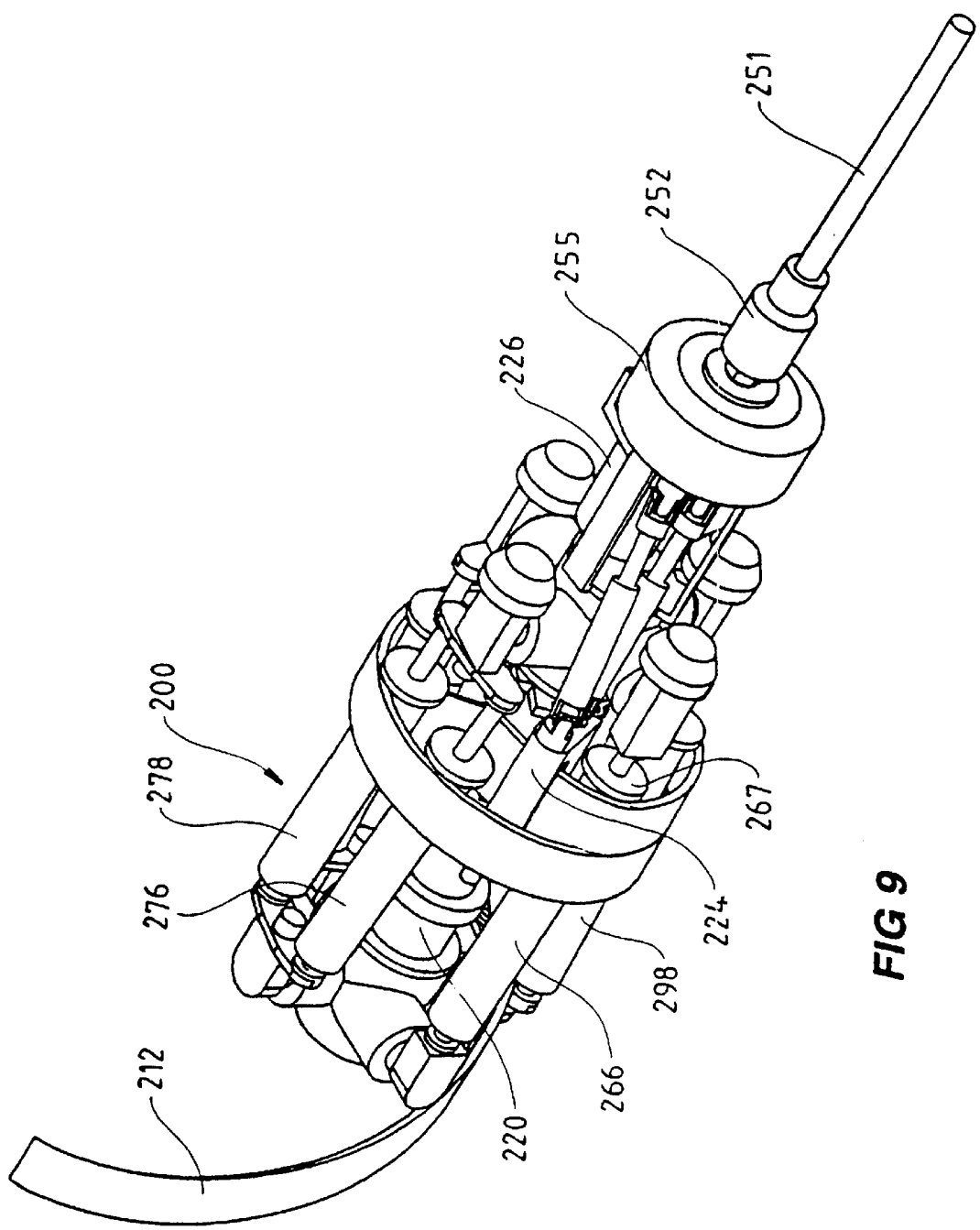
FIG. 9 is the same perspective view as that of FIG. 8 except that it shows the machine in use with strip 112 being introduced into the machine.
Figure 11:
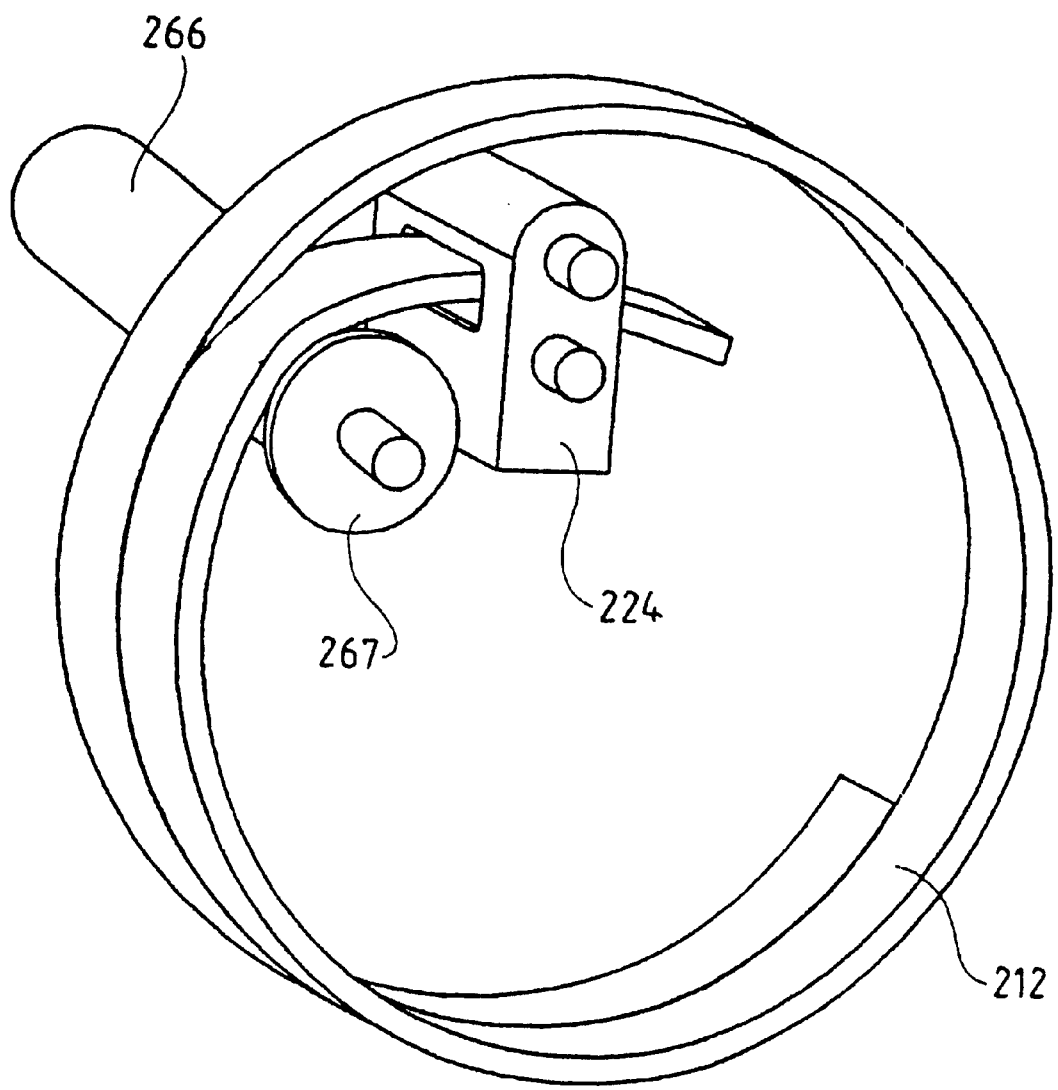
FIG. 11 shows a partial front perspective view of the machine of FIG. 8 together with partially wound strip material 112.

The pipe winding machine 200, shown in FIG. 8, is able to create a helical pipe by feeding a strip of material, from a position inward of the helical pipe to be formed, to a position adjacent the previous winding of the strip 212, as is most clearly illustrated in FIG. 11 (also see FIG. 9).

The pipe winding machine 200 can either be fixed, with the helical pipe produced exiting from the machine in a continuous process, or can be movable against the newly formed fixed helical pipe. The following description of the machine and how it works is based on the latter (a movable machine) operating within a conduit (for instance, a degraded sewer conduit).

Referring to FIG. 8, the pipe winding machine 200 has a frame 220 supporting seven circumferentially spaced guide rollers 266, 276, 278, 286, 288, 296 and 298. The outer surfaces of these five rollers provide a helical path for the strip 212. A rear end view of machine 200, presented in FIG. 12, shows the spatial positioning of these rollers. A pair of driving rollers are mounted within a pinch box 224 which is mounted inward of the circumference of the helical pipe being formed (refer FIG. 9). Pinch box 224 is mounted to frame 220 and has two counter rotating rollers which drive strip 212 to a position adjacent the previous winding of strip 212 causing the adjacent edges of strip 212 to interlock. As this is a continuous process, it causes strip 212 to be rolled into a continuous helical pipe around the winding machine 200 as shown in FIG. 9. The circumferentially spaced rollers 266, 276, 278, 286, 288, 296 and 298 support the machine 200 against the inside of the newly formed helical pipe as shown in FIG. 9.

Four leading guide rollers 301, 302, 303 and 304 are provided at the front of the machine 200 primarily for stabilisation of the machine as it is inserted into a conduit to be lined. Where machine 200 is to be used free-standing or in a trench, guide rollers 301, 302, 303 and 304 are not required.

Hydraulic power is provided to pipe winding machine 200 via hydraulic fluid hose 251 as shown in FIG. 8. Hydraulic fluid hose 251 is coupled to machine 200 using a rotatable hydraulic coupling 252. Hydraulic motor 226 drives gearbox 255 which, in turn, drives counter rotating drive shafts 230 and 231. These drive shafts are connected to the rollers within pinch box 224 to drive inner pinch roller 227 and outer pinch roller 228.

Pinch box 224 is mounted to frame 220 in such a way as to allow adjustment of its angle with respect to frame 220.

Drive shafts 230 and 231 are telescopic and have universal joints mounted at each of their ends to allow the aforesaid adjustment of pinch box 224.

Figure 14:
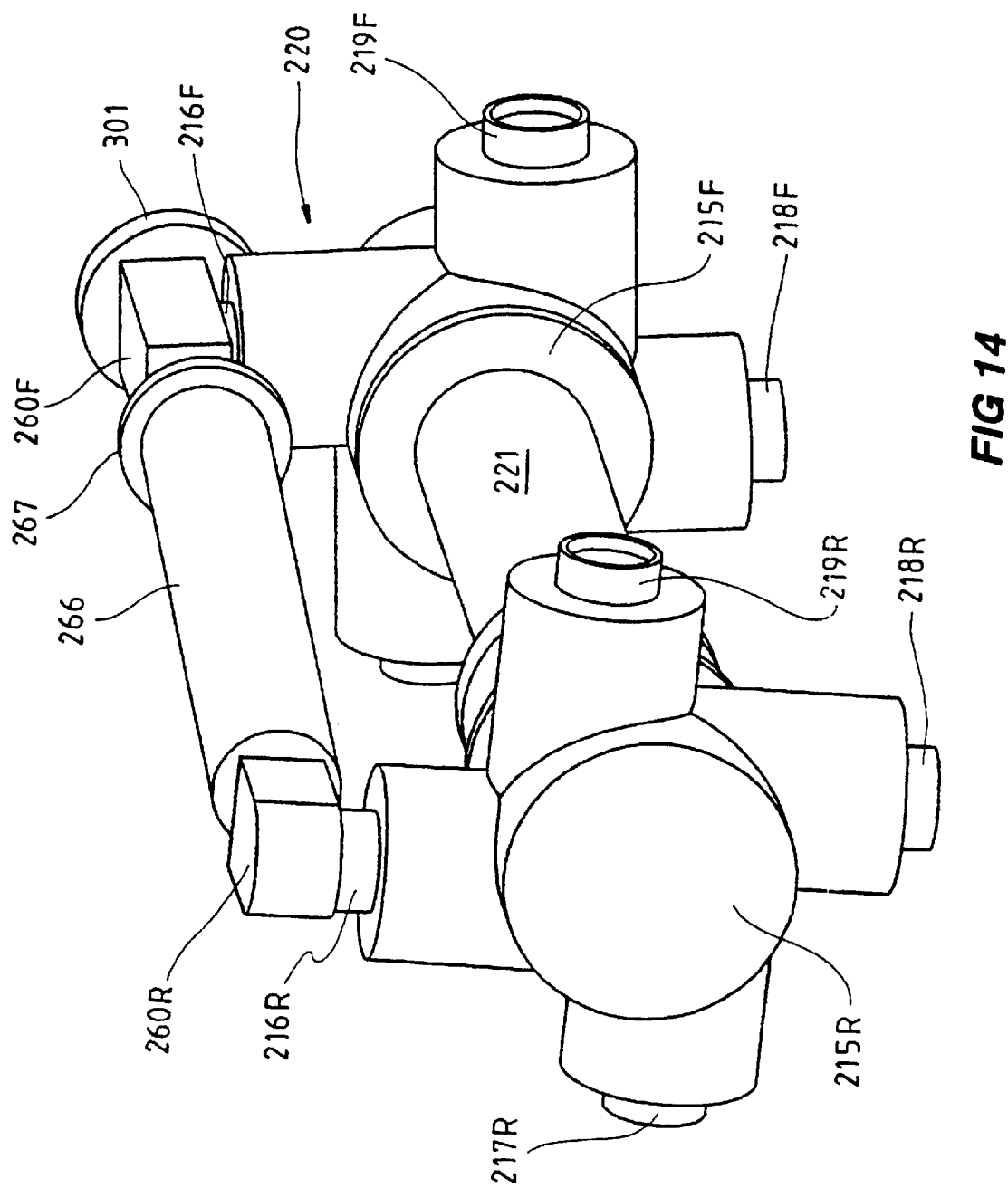
FIG. 14 shows a partial sub-assembly of the machine of FIG. 8, including its frame and a single roller from a rear perspective view.

In order to provide radial adjustment to rollers 266, 276, 278, 286, 288, 296 and 298 and therefore to allow machine 200 to operate for differing wound pipe diameters, interposed between frame 220 and the aforesaid rollers are pairs of adjustable radial arms 216F and 216R, 217F and 217R, 218F and 218R, and 219F and 219R. The arrangement of these arms relative to frame 220 is most clearly shown in FIG. 14. Frame 220 consists of a front hub 215F and a rear hub 215R joined by shaft 221. The front hub supports four arms 216F, 217F, 218F and 219F. These arms are in the form of piston rods which are hydraulically driven out of hub 215F. The rear hub 215R is of a similar construction to the front hub as shown in FIG. 14.

Figure 10:
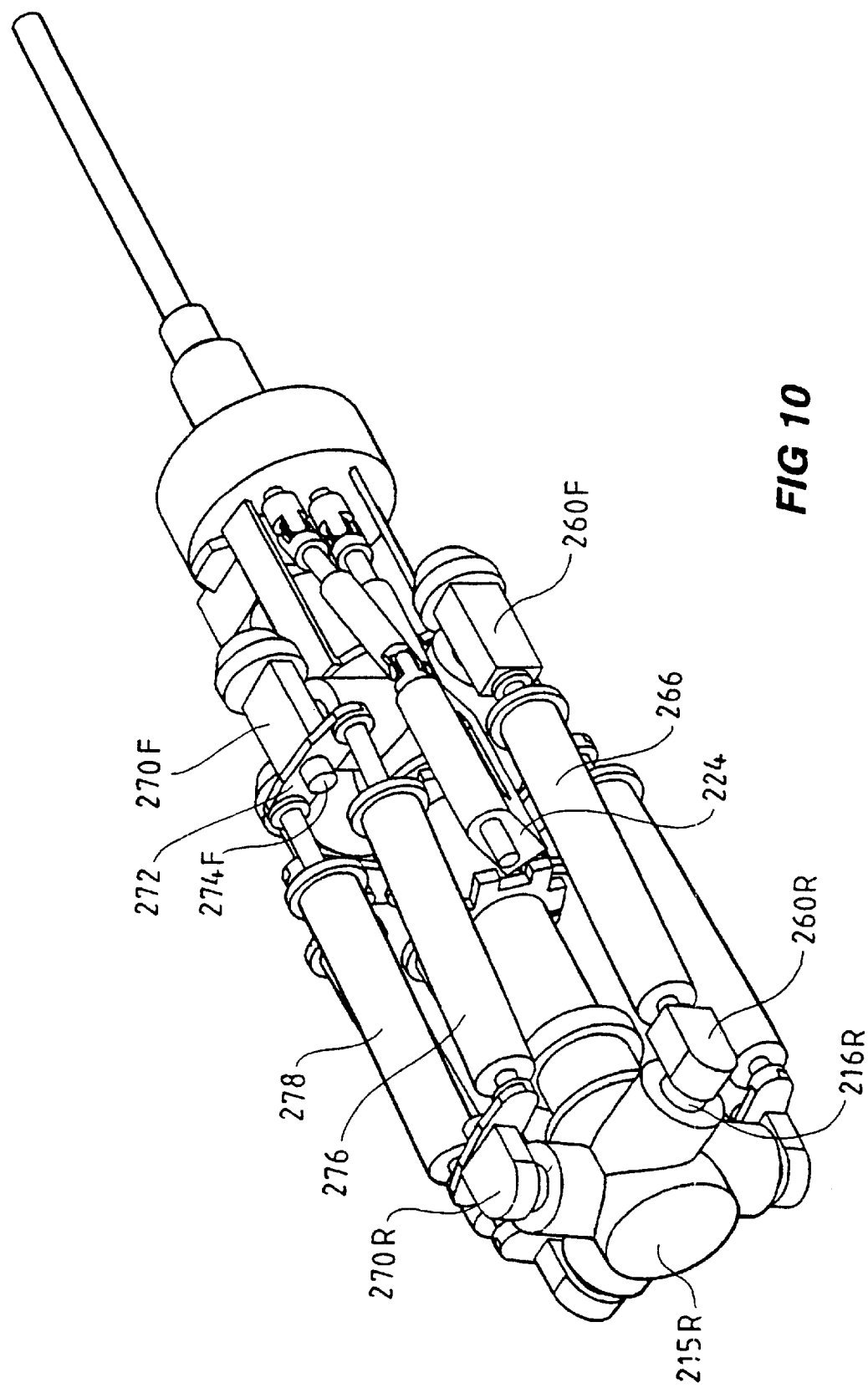
FIG. 10 is a rear perspective view of the machine of FIG. 8.

Connected to the distal ends of radial arms 216F, 217F, 218F and 219F are front bosses 260F, 270F, 280F and 290F respectively (refer FIG. 10). Bosses 260F and 260R support roller 266 as shown in FIG. 14. The remaining bosses support rocker arms 272F and 272R, 282F and 282R, and 292F and 292R. These rocker arms are pivotally mounted to their respective bosses as is shown in FIG. 10 (boss 270F and boss 270R are clearly visible in this perspective view). Rollers 276, 278, 286, 288, 296 and 298 are rotatably supported by their respective rocker arms as shown in FIG. 10. Pivotal supports 274F and 274R, 284F and 284R, and 294F and 294R allow their respective rocker arms to pivot and therefore allow the rollers that they support some degree of freedom thereby enabling them to remain in contact with the pipe being formed as shown in FIG. 12.

Rollers 266, 276, 278, 286, 288, 296 and 298 are preferably split into groups of rollers on the same axis having widths approximating that of the strip 212 to be wound.

Figure 15:
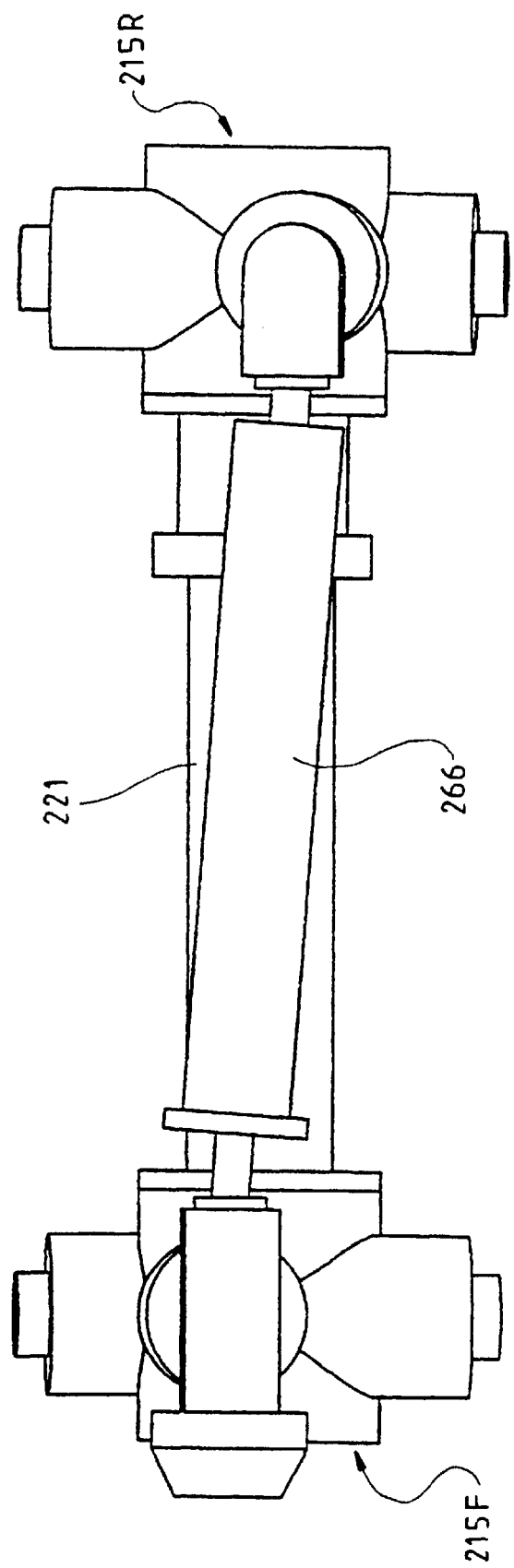
FIG. 15 shows the sub-assembly of FIG. 14 in side view.

Referring to FIG. 15, it can be seen that the front hub 215F is angled with respect to the rear hub 215R. Because of this, rollers 266, 276, 278, 286, 296 and 298 are angled with respect to cylinder 221. In use, this angle is set such that machine 200 will follow the correct helical path to match the helix that results from a given strip width and pipe diameter.

Figure 16:
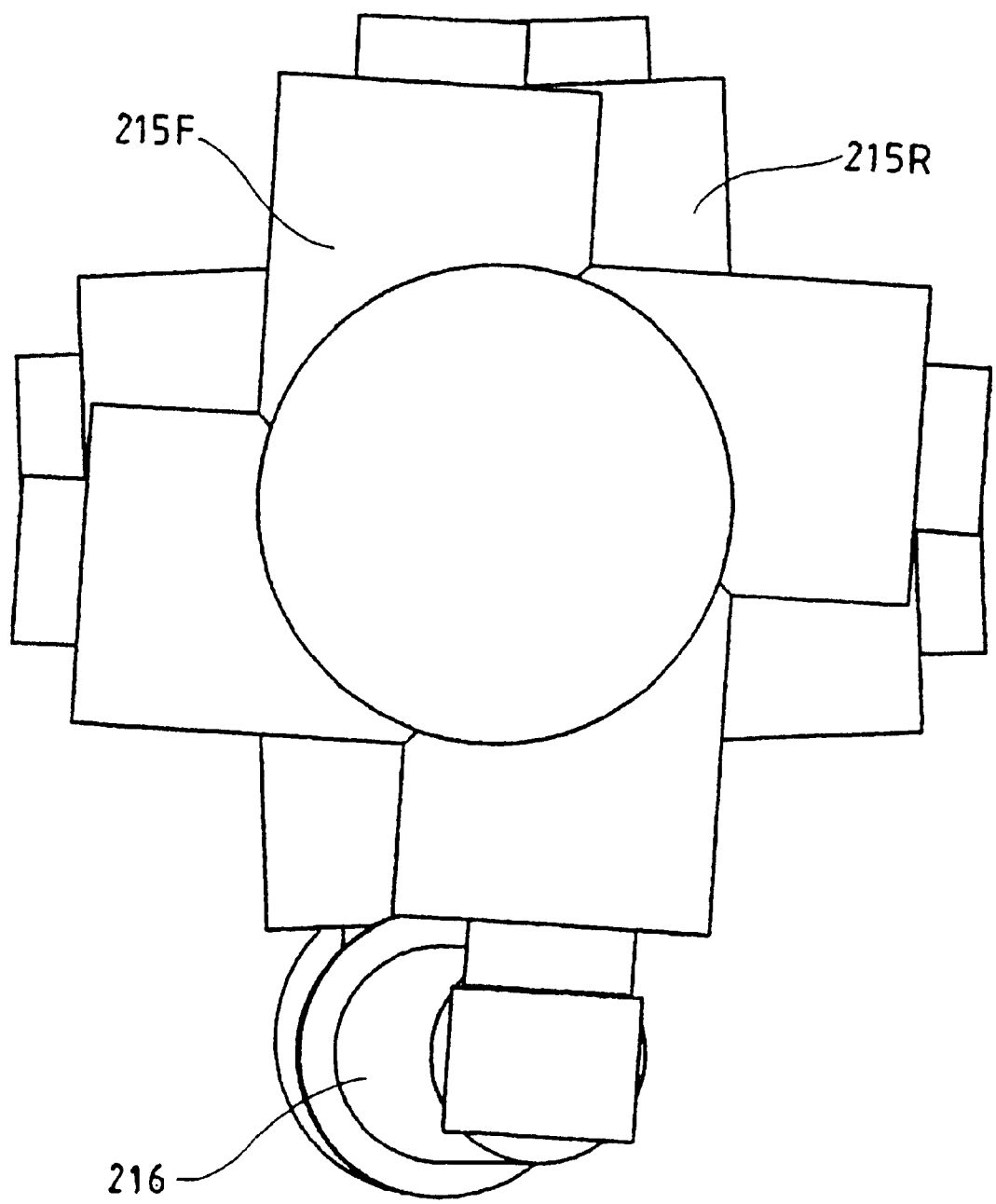
FIG. 16 shows the sub-assembly of FIG. 14 in end view.
Figure 17:
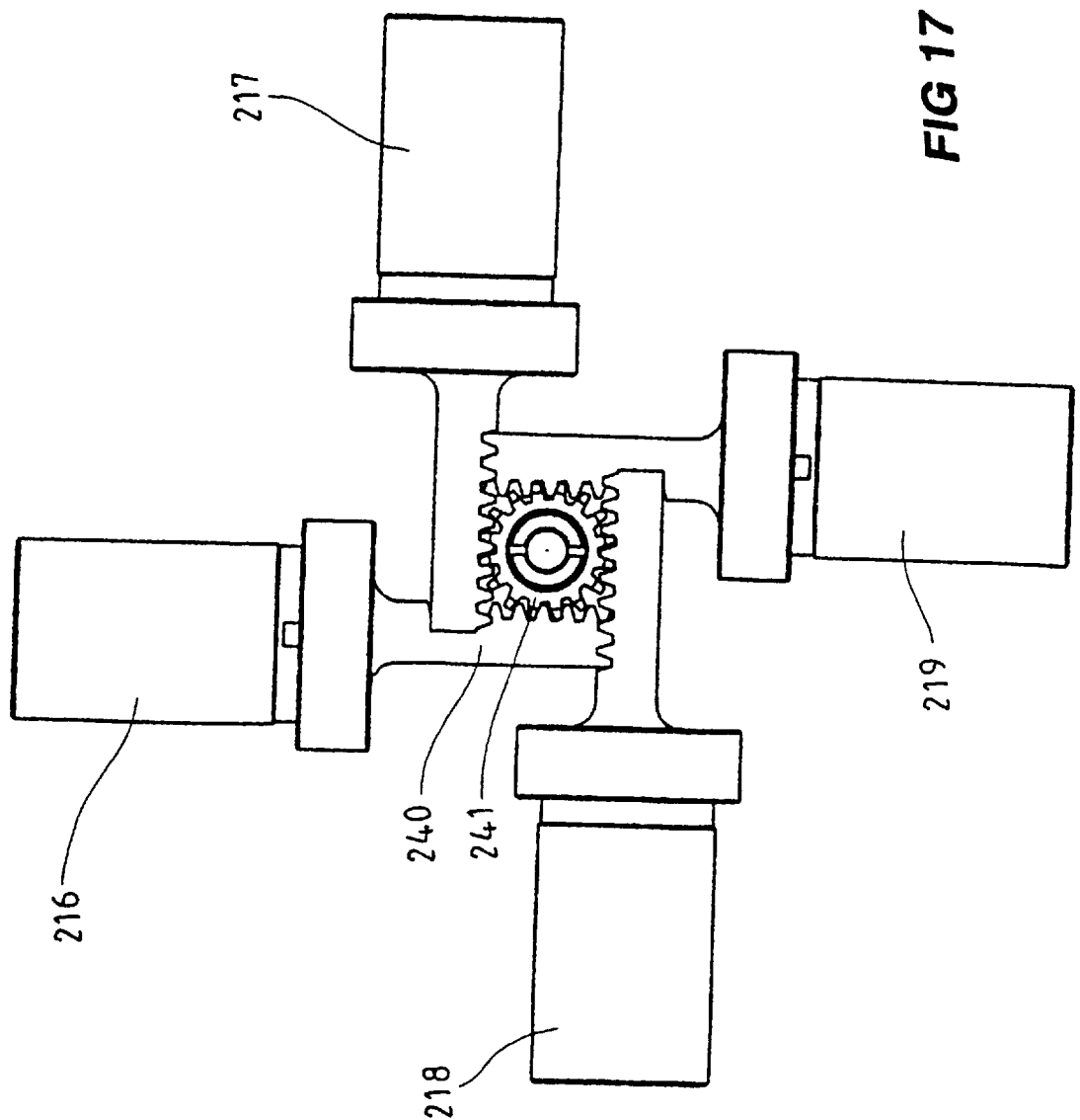
FIG. 17 shows a second sub-assembly of the machine of FIG. 8 in end view.
Figure 19:
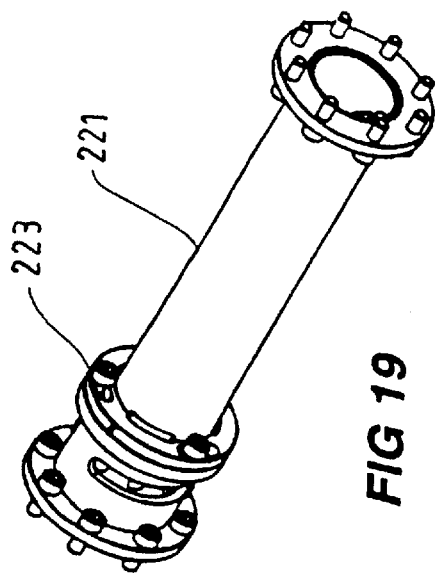
FIG. 19 shows a perspective view of the sub-assembly of FIG. 8.
Figure 18:
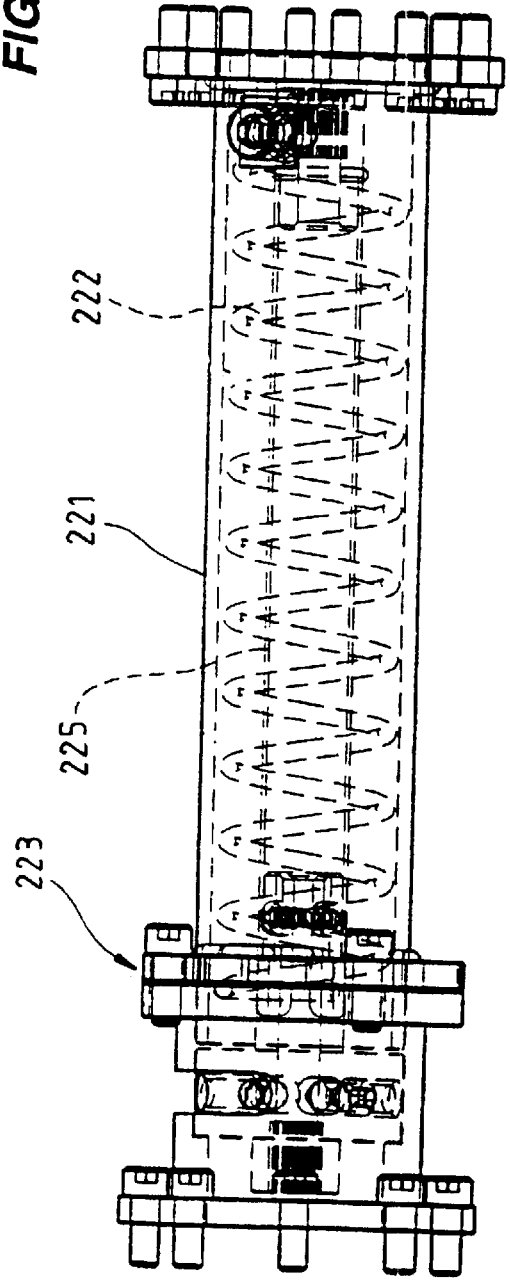
FIG. 18 shows a further sub-assembly of the machine of FIG. 8.
Figure 21:
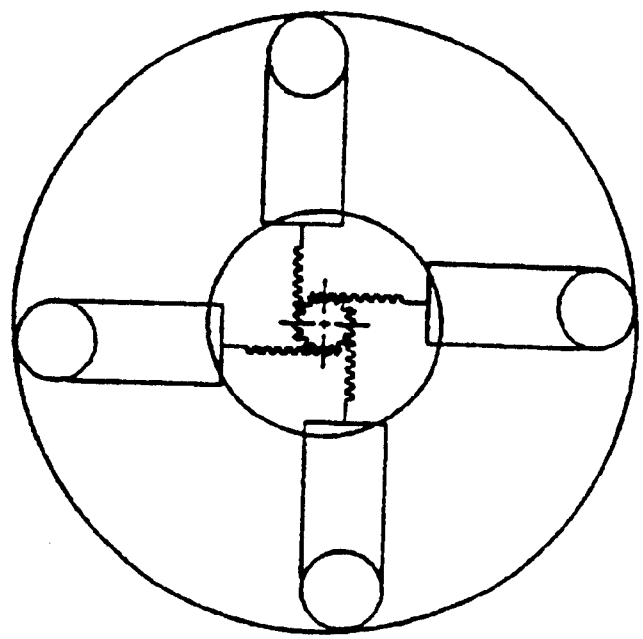
FIGS. 20 and 21 show a schematic view of the machine of FIG. 8 in end view, placed inside a conduit to be lined.
Figure 20:
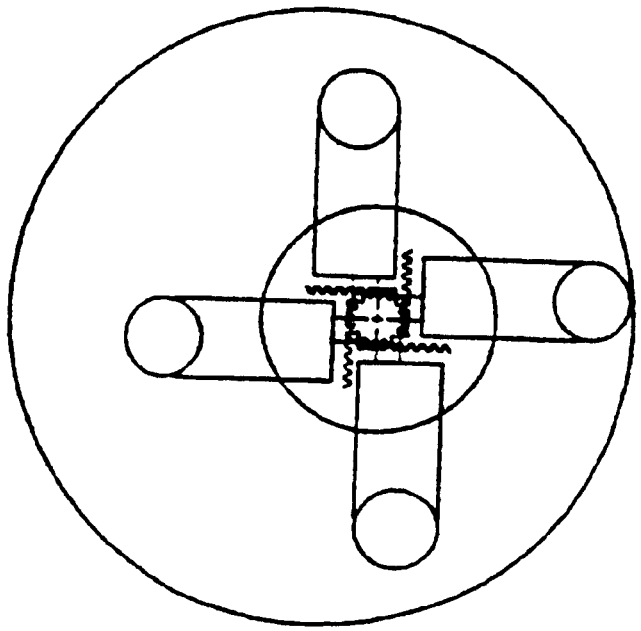

Referring to FIG. 17, radial arms 216, 217, 218 and 219 are all connected to pinion 241 through respective racks 240. This rack and pinion connection ensures that the extension of each radial arm relative to the pinion is equal. Furthermore, this arrangement is identical in both the front and rear hubs 215F and 215R except that the racks 240 on opposing hubs 215F and 215R engage opposite sides of their pinions 241. This separation of the racks and their corresponding pistons, together with the angling of the hubs 215F and 215R towards each other as shown in FIGS. 14, 15 and 16, causes a convergence of front and rear bosses 260F and 260R, 270F and 270R, 280F and 280R and 290F and 290R as radial arms pieces 216F and 216R, 217F and 217R, 218F and 218R and 219F and 219R are extended. The corresponding pinions 241F and R are mechanically linked via shaft 225 as shown in FIG. 18. This ensures that the eight radial arms 216F and R, 217F and R, 218F and R, and 219F and R all move in unison and, at any one time, are all displaced the same distance from their corresponding pinion 241.

The arms are driven outwards by hydraulic pressure and are pulled inwards by rotation of pinions 41 driving racks 40. Pinions 41 are linked by shaft 225 which is connected to one end of coil spring 222 as shown in FIG. 18. The other end of coil spring 222 is fixed to cylinder 221. During assembly of frame 220, coil spring 222 is pretensioned to ensure that when no hydraulic pressure is supplied, the radial arms will be retracted by the spring tension.

The offset between the front hub 215F and the rear hub 215R can be varied by rotation at cylinder joint 223 as shown in FIG. 18. Different angles will be required for strip profiles of differing widths. Once the angle is set for a particular strip width, then pipe winding machine 200 can be used for a range of diameter pipes. As the radial arms move out in unison, the angle of the rollers 266, 276, 278, 286, 288, 296 and 298 with respect to the longitudinal axis of the machine 200 varies to match the helix angle of the pipe being wound because of the geometry described above and shown in FIGS. 14, 15 and 16. This occurs automatically without the need for any user intervention.

As stated above, the pipe winding machine 200 can also be used to create a free standing pipe above ground or in a trench. When used in this mode, the strip must include an interlocking section. The interlocking profile of the previous helical winding provides a surface against which the strip can be pressed into by the pinch rollers against the reactive force provided by the tension in the adjacent convolution(s) of the strip 212 (as shown in FIGS. 11 and 12).

While the present invention has been described in terms of a preferred embodiment and a preferred method in order to facilitate better understanding of the invention, it should be appreciated that various modifications can be made without departing from the principles of the invention. Therefore, the invention should be understood to include all such modifications within its scope.

What is claimed is:

1. A method of winding a helically wound pipe having an axis from a strip having connecting formations spaced apart transversely on the strip and adapted to interlock when the strip is wound in a helical path and adjacent edge portions of the strip overlap one another, said method comprising the steps of:

feeding the strip in a substantially axial direction with respect to the axis of the pipe being wound;

passing the strip between at least one pair of drive rollers located inside of said helical path;

driving the strip around the outside of a plurality of circumferentially spaced guide rollers arranged to form a guide to enable the strip to follow the helical path; and effecting the interlocking of the adjacent edge portions of the strip relying solely on forces acting on the driven strip and the reactive force provided by tension in adjacent convolution(s) of the strip.

2. A method according to claim 1 wherein the radial positions of the guide rollers are adjusted during winding of the strip, thereby varying the circumferential length of the helical pipe being wound.

3. A method according to claim 2 wherein the radial positions of the guide rollers are adjusted in unison.

4. A method according to claim 2 wherein the angles of the axes of the guide rollers relative to the longitudinal axis of the wound pipe are adjusted during the winding, thereby changing the helix angle of the helical path.

5. A method according to claim 4 wherein the adjustment of both the radial positions and the angles of the axes of the guide rollers are synchronized such that as the radial positions are extended the angles decrease to thereby reduce the helix angle of the helical path.

6. A machine for winding a helically wound pipe from a strip having complementary connecting formations extending along opposite edge portions thereof and which are adapted to interlock when the strip is helically wound comprising:

a frame having at least three circumferentially spaced guide rollers adapted to bear against the inner periphery of the pipe being wound, the rollers forming a guide to enable the strip to follow a helical path along which the strip is directed when the machine is in use;

a pair of strip drive rollers mounted to the frame structured and positioned to drive the strip around the outside of the guide rollers so as to follow the helical path and cause the adjacent edge portions of adjacent convolutions of the strip to interlock; and one or more drive units mounted to the frame for driving the strip drive roller, wherein the pair of strip drive rollers is located wholly inside the helical path and there is no support arranged to bear against the outer periphery of the pipe being wound to cause the interlock of the adjacent edge portions of the strip.

7. A machine according to claim 6 wherein the frame comprises a first adjustment sub-system structured and positioned to adjust the radial positions of the guide rollers.

8. A machine according to claim 7 wherein the frame further comprises a second adjustment sub-system structured and positioned to adjust the angles of the axes of the guide rollers relative to the longitudinal axis of the machine.

9. A machine according to claim 7 wherein the first adjustment sub-system comprises fluid pressure actuators arranged to exert on each guide roller a substantially equal force.

10. A machine according to claim 9 wherein said fluid pressure actuators are arranged so that the force exerted on each guide roller is independently controlled.

11. A machine according to claim 6 wherein the frame further comprises an adjustment sub-system structured and positioned to adjust both the radial positions of the guide rollers and the angles of the axes of the guide rollers relative to the longitudinal axis of the machine.

12. A machine according to claim 11 wherein the adjustment sub-system is arranged to adjust the radial positions and said angles of the guide rollers in unison.

13. A machine according to claim 12 wherein the adjustment sub-system is arranged to that the radial positions and said angles are synchronized such that as the radial positions are extended the angles decrease to thereby reduce the helix angle of the helical path.

14. A machine according to claim 13 wherein said adjustment sub-system comprises first and second sets of longitudinally spaced apart outwardly projecting fluid pressure actuated arms, each of the guide rollers being rotatably supported at its opposite ends by two of said arms, one from each said set, wherein the arms of each said set are mechanically linked so that they extend in unison.

15. A machine according to claim 14 wherein the machine is self-propelling, said frame rotating about an axis which coincides with the axis of the pipe being wound and advancing axially as the pipe is wound.

16. A machine for winding a helically wound pipe from a strip having complementary connecting formations extending along opposite edge portions thereof and which are adapted to interlock when the strip is helically wound comprising:

a frame having at least three circumferentially spaced guide rollers adapted to bear against the inner periphery of the pipe being wound, the rollers forming a guide to enable the strip to follow a helical path along which the strip is directed when the machine is in use;

a pair of strip drive rollers mounted to the frame for driving the strip around the outside of the rollers so as to follow the helical path and cause the adjacent edge portions of adjacent convolutions of the strip to interlock;

one or more drive units located wholly inside the helical path and mounted to the frame for driving the pair of strip drive rollers; and an adjustment sub-system structured and positioned to adjust both the radial positions of the guide rollers and the angles of the axes of the guide rollers relative to the longitudinal axis of the machine.

17. A machine according to claim 16 wherein the adjustment sub-system is arranged to adjust the radial positions and said angles of the guide rollers in unison.

18. A machine according to claim 17 wherein the adjustment sub-system is arranged so that the radial positions and said angles are synchronized such that as the radial positions are extended the angles decrease to thereby reduce the helix angle of the helical path.

19. A machine according to claim 17 wherein said adjustment sub-system comprises first and second sets of longitudinally spaced apart outwardly projecting fluid pressure actuated arms, each of the guide rollers being rotatably supported at its opposite ends by two of said arms, one from each said set, wherein the arms of each said set are mechanically linked so that they extend in unison.

20. A machine according to claim 19 wherein the machine is self-propelling, said frame rotating about an axis which coincides with the axis of the pipe being wound and advancing axially as the pipe is wound.

* * * * *